United States Patent
Gabriel

(10) Patent No.: US 6,997,120 B2
(45) Date of Patent: Feb. 14, 2006

(54) PLANTING APPARATUS AND METHOD

(76) Inventor: Robert Gabriel, 8474 Hazwlgreen Rd. NE., Silverton, OR (US) 97381

(*) Notice: Subject to any disclaimer, the term of this patent is extended or adjusted under 35 U.S.C. 154(b) by 0 days.

(21) Appl. No.: 10/439,844

(22) Filed: May 15, 2003

(65) Prior Publication Data

US 2004/0244660 A1 Dec. 9, 2004

(51) Int. Cl.
*A01C 11/00* (2006.01)
*A01G 23/02* (2006.01)

(52) U.S. Cl. .................... 111/101; 111/105; 111/111; 111/112; 111/200; 111/900; 111/903

(58) Field of Classification Search ............... 111/100, 111/101, 104, 200, 903, 105, 109, 111, 112, 111/113, 906, 919, 900
See application file for complete search history.

(56) References Cited

U.S. PATENT DOCUMENTS

| | | | | |
|---|---|---|---|---|
| 4,355,588 A | * | 10/1982 | Armstrong et al. | 111/109 |
| 5,224,554 A | * | 7/1993 | Poll | 172/772 |
| 5,646,846 A | * | 7/1997 | Bruce et al. | 701/50 |
| 5,655,467 A | * | 8/1997 | Yasuda et al. | 111/100 |
| 5,684,476 A | * | 11/1997 | Anderson | 340/988 |
| 5,915,313 A | * | 6/1999 | Bender et al. | 111/178 |
| 5,928,309 A | * | 7/1999 | Korver et al. | 701/214 |
| 5,991,694 A | * | 11/1999 | Gudat et al. | 702/2 |
| 6,164,223 A | | 12/2000 | Eriksson | |
| 6,167,819 B1 | | 1/2001 | Rail | |
| 6,223,662 B1 | * | 5/2001 | Lastinger et al. | 111/104 |
| 6,553,299 B1 | * | 4/2003 | Keller et al. | 701/50 |
| 6,678,580 B2 | * | 1/2004 | Benneweis | 700/237 |
| 2003/0159633 A1 | * | 8/2003 | Upadhyaya et al. | 111/200 |
| 2003/0187560 A1 | * | 10/2003 | Keller et al. | 701/50 |

OTHER PUBLICATIONS

Daleys, Guide to Care and Planting of Fruit Trees, available at http://www.daleysfruit.com.au/fruit%20pages/features2.htm, last update Mar. 14, 2002.*
Holland Transplanter website, *The Rotary One*, 2 pages—http://www.transplanter.com/rotary1.htm.
Holland Transplanter website, *Three Solid Performer*, 3 pages—http://www.transplanter.com/cnvplant.htm.
IntegriNautics Corp. website, *IntergiNautics: Precision control for heavy equipment*, 1 page—http://www.integrinautics.com/technology.

* cited by examiner

*Primary Examiner*—Christopher J. Novosad
(74) *Attorney, Agent, or Firm*—Klarquist Sparkman, LLP

(57) ABSTRACT

In one embodiment, an apparatus comprises a vehicle, such as a tractor, and a planting apparatus that is movable across the ground by the vehicle. The vehicle desirably has a guiding system for automatically guiding the vehicle to follow a predetermined planting path as the vehicle moves across the ground. The guiding system can comprise, for example, a global positioning system for determining the instantaneous positions of the vehicle and an automatic steering system for steering the vehicle based on positioning information from global positioning. As the vehicle moves the planting apparatus along the planting path, the planting apparatus plants a row of plants, such as trees or other agricultural products, at spaced apart locations along the planting path.

42 Claims, 10 Drawing Sheets

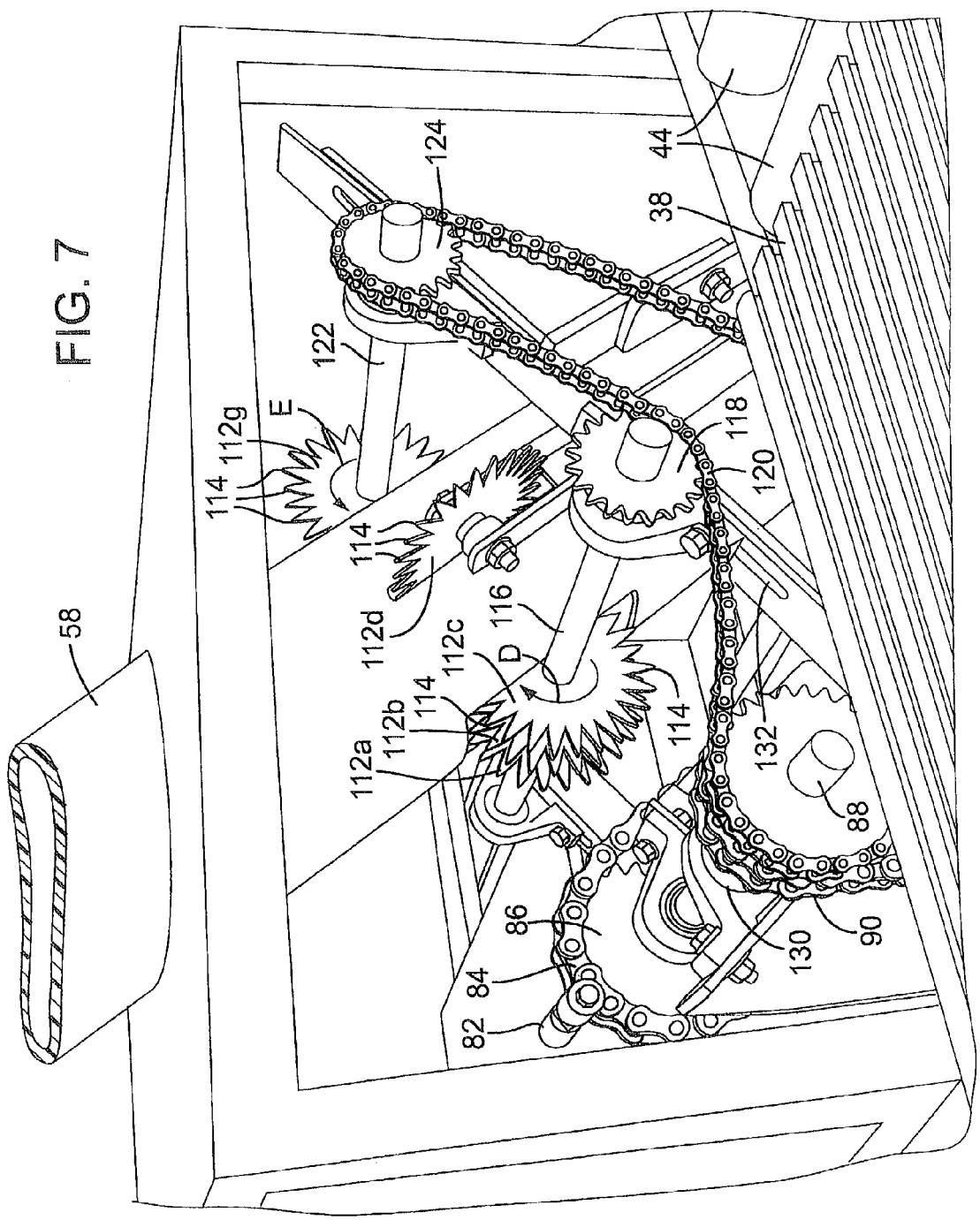

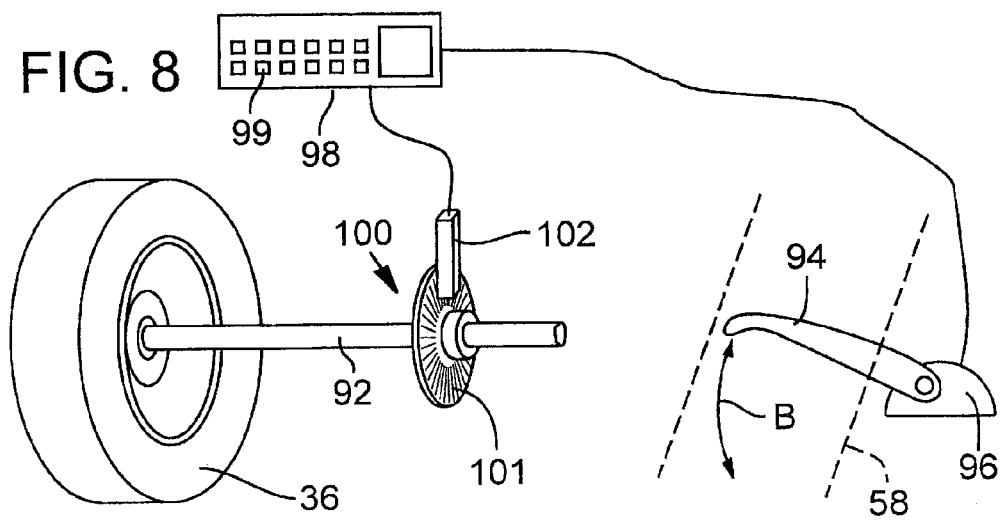
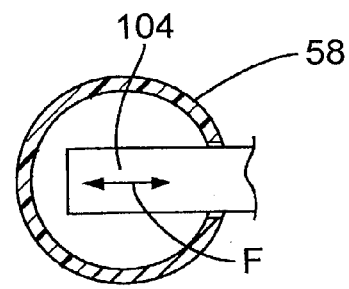
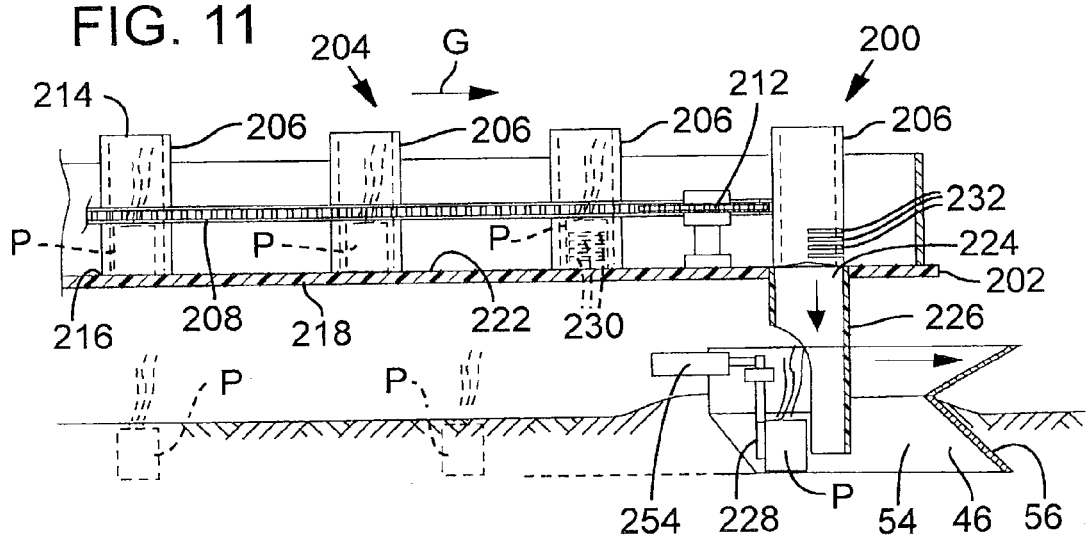

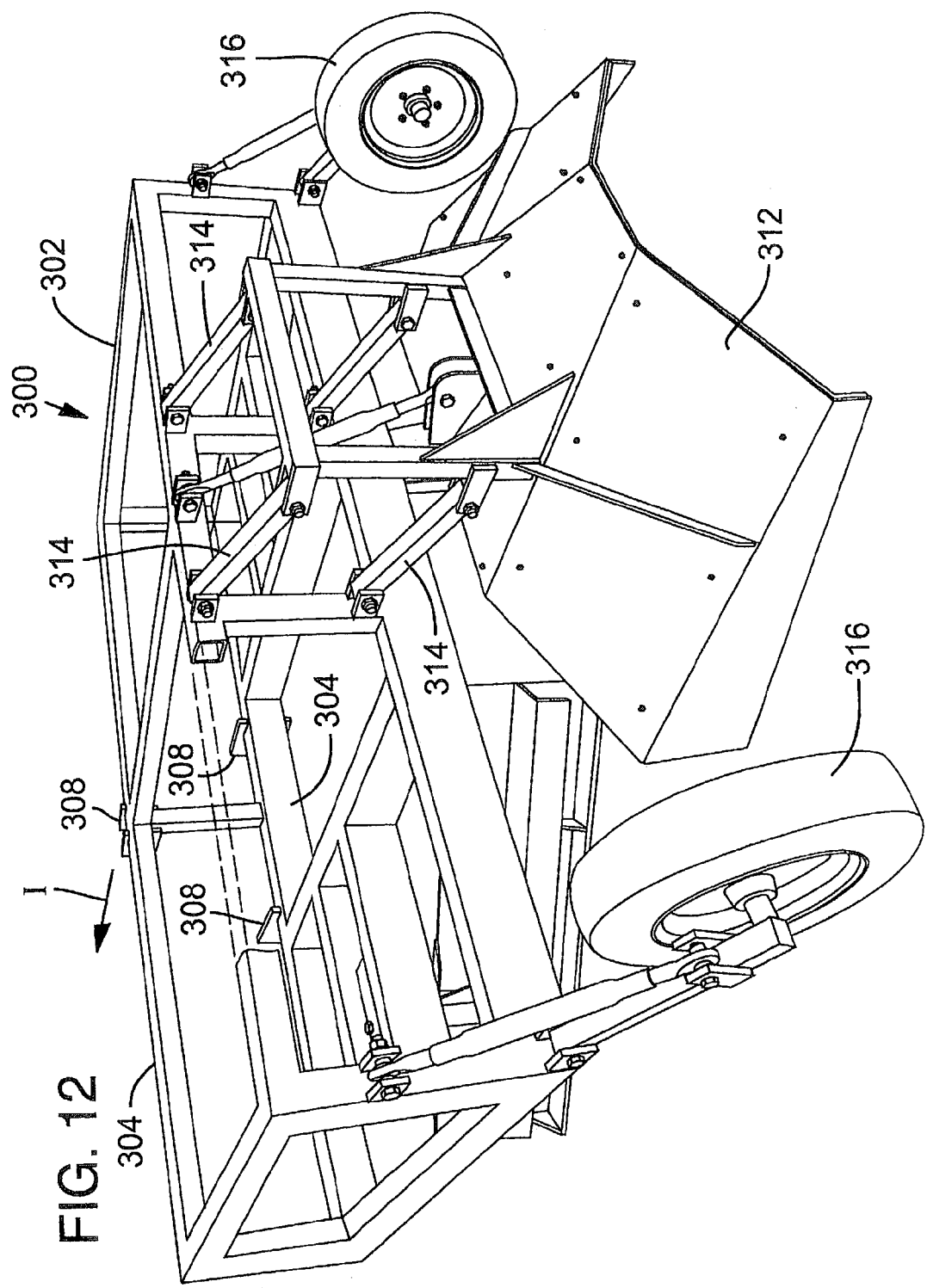

PLANTING APPARATUS AND METHOD

FIELD

The present invention concerns a planting apparatus and method.

BACKGROUND

Conventional methods for planting a field of plants, such as blueberry plants and the like, involve slowly hauling a load of trees across the field with a tractor as a team of workers follow closely behind the tractor. The tractor stops periodically as workers manually pick up individual trees, roughen their root balls, and plant them in the ground in rows. As can be appreciated, the process of manually planting trees is labor-intensive and requires a large number of monotonous man-hours for completion.

At harvest, mechanized harvesting equipment is operated to move along the rows of trees to remove their crops. The total amount of the crop that can be harvested using such equipment depends in part upon the alignment of the trees in their respective rows. Because a high degree of precision often cannot be achieved in aligning the trees in rows by manual planting, a minimum amount of crop loss typically can be expected during harvesting. For example, about a 10 to 20% crop loss usually occurs in harvesting the crop of a blueberry field established using manual planting methods.

Hence, a need exists for new and improved apparatus and methods for planting trees.

SUMMARY

The present invention is directed toward new and nonobvious aspects and features of a planting apparatus, both alone and in various combinations and sub-combinations with one another, which are set forth in the claims below. Unique and nonobvious methods for planting plants are also disclosed herein.

The planting apparatus, according to one representative embodiment, comprises a vehicle, such as a tractor, and a planting apparatus that is movable across the ground by the vehicle. The vehicle desirably has a guiding system for automatically guiding the vehicle to follow a predetermined planting path as the vehicle moves across the ground. The guiding system can comprise, for example, a global positioning system for determining the instantaneous positions of the vehicle and an automatic steering system in communication with the global positioning system. The steering system is operable to steer the vehicle based on positioning information from the global positioning system such that the vehicle follows the planting path. As the vehicle moves the planting apparatus along the planting path, the planting apparatus plants a row of plants, such as trees or other agricultural products, at spaced apart locations along the planting path.

In particular embodiments, the planting apparatus may include a furrow former configured to form a furrow or trench along the planting path for planting the plants, a root-loosening device that loosens the root balls of the plants (e.g., if the plants are of the type which have a root ball), a planting unit that is operable to deposit plants in the furrow such that the plants are equally spaced from each other in the furrow, and a furrow filler that replaces earth in the furrow after plants are deposited in the furrow by the planting unit.

The planting unit in an illustrated embodiment for planting plants having a root system includes a generally downwardly extending plant guide having an inlet and an outlet. A plant support is movable with respect to the guide between a first position and a second position. When the plant support is in the first position and a plant is inserted through the inlet of the guide, the plant support supports the plant. When the plant support is moved to the second position, the plant is allowed to fall through the outlet of guide into the trench. Movement of the plant support can be controlled through various mechanical, electrical, or electromechanical devices. In particular embodiments, for example, the plant support is a lever extending into the guide and mounted for pivoting movement relative to guide. The lever may be resiliently biased toward the first position by a biasing mechanism so that the lever is normally in a position to support a plant inserted into the guide. A tripping mechanism is configured to periodically trip the lever (i.e., move the lever to the second position against the biasing force of the biasing mechanism), thereby allowing a plant supported by the lever to fall through the outlet of the guide into the trench. In another embodiment, the lever is coupled to an actuator that moves the lever between the first and second positions. A controller is used to control movement of the actuator, and therefore the lever.

In certain embodiments, the root-loosening device includes one or more blades mounted for rotational movement on the planting unit. Each blade may include a plurality of circumferentially spaced teeth for engaging the root ball of a plant. As the teeth engage the root ball, the rotation of the teeth relative to the root ball have the effect of "roughening" or loosening the root ball so that individual roots or clusters of roots are separated or loosened from the root ball. In an illustrated embodiment, the blades are mounted so that they extend partially into the guide. Thus, a plant inserted into the guide falls by gravity onto the blades, which engage the root ball of the plant, simultaneously roughening the root ball and propelling the plant downwardly through the guide.

In another embodiment, the planting apparatus comprises a conventional transplanter, such as used to plant plug plants. Such transplanters are commercially available, such as from Holland Transplanter of Holland, Mich. In other embodiments, the planting apparatus comprises a conventional seed planter or bulb planter for planting plants in the form of bulbs or seeds.

In another representative embodiment, an apparatus for planting plants in the ground comprises a body that is movable in a direction of travel across the ground. A planting mechanism, mounted to or otherwise carried by the body, is operable to automatically plant plants in the ground to form a row of plants as the body moves across the ground. The planting mechanism may include a root roughener configured to roughen the root balls of the plants before the plants are planted in the ground.

In yet another representative embodiment, an apparatus for planting plants in the ground comprises planting means for automatically planting a row of plants along a predetermined planting path and moving means for moving the planting means along the planting path. The apparatus also includes guiding means for automatically guiding the moving means to follow the planting path. In addition, the apparatus can include means for loosening the root balls of plants before they are planted.

In another representative embodiment, an apparatus for planting a row of plants in the ground comprises a body that is movable in a direction of travel across the ground. A trench former is mounted to the body and configured to form a continuous trench in the ground as the body moves across the ground. A planting unit also is mounted to the body. The planting unit is operable to position plants at spaced apart locations in the trench to form the row of plants as the body moves across the ground. A controller is operable to control the planting unit such that a predetermined spacing is maintained between the plants in the trench.

In another representative embodiment, a method for planting a row of plants in the ground comprises automatically guiding a planting apparatus to follow a predetermined planting path. As the planting apparatus is guided along the planting path, plants are automatically planted with the planting apparatus to form a row of plants along the planting path. In a specific approach, the act of automatically planting plants comprises forming a trench along the planting path, automatically depositing plants at spaced apart locations in the trench with the planting apparatus, and replacing earth back in the trench after plants are deposited in the trench.

In still another representative embodiment, a method for planting a row of plants in the ground comprises forming a continuous furrow in the ground and depositing plants at spaced apart locations in the furrow with a planting mechanism. In this embodiment, the planting mechanism is electronically controlled to deposit the plants in the furrow such that a predetermined plant spacing is maintained between the plants in the row.

The foregoing and other features and advantages of the invention will become more apparent from the following detailed description of several embodiments, which proceeds with reference to the accompanying figures.

BRIEF DESCRIPTION OF THE DRAWINGS

FIG. 7 is an enlarged, perspective view of a portion of the planting apparatus of FIG. 2, illustrating one form of a root-loosening mechanism for loosening the root balls of plants passing through the guide.

FIG. 8 is a schematic illustration of a planting unit, according to one embodiment, having a controller and an electric sensor for controlling the planting of plants.

FIG. 9 is a schematic illustration of another embodiment of a planting unit.

FIG. 11 is an enlarged, side elevation view of a portion of the planting apparatus of FIG. 10.

FIG. 12 is a perspective view of a planting-bed former for forming a raised planting bed, according to one embodiment, as viewed from the side and the rear.

DETAILED DESCRIPTION

As used herein, the singular forms "a," "an," and "the" refer to one or more than one, unless the context clearly dictates otherwise.

As used herein, the term "includes" means "comprises."

As used herein, a group of individual members stated in the alternative includes embodiments relating to a single member of the group or combinations of multiple members. For example, the term "furrow former, planting unit, or trench filler," includes embodiments relating to "furrow former," "planting unit," "trench filler," "furrow former and planting unit," "planting unit and trench filler," "furrow former and trench filler," and "furrow former, planting unit, and trench filler."

As used herein, the term "plant" refers to plants (e.g., trees, bushes, flowers, and shrubs) and parts thereof, including, but not limited to, trees, seeds, bulbs, and cuttings.

As used herein, the term "trench" or "furrow" refers to a trench formed in generally flat ground, a trench formed in a hill or elevated planting bed. A trench can extend continuously along a planting path, or alternatively, a trench can be a series of discrete holes formed along a planting path.

Figure 1:
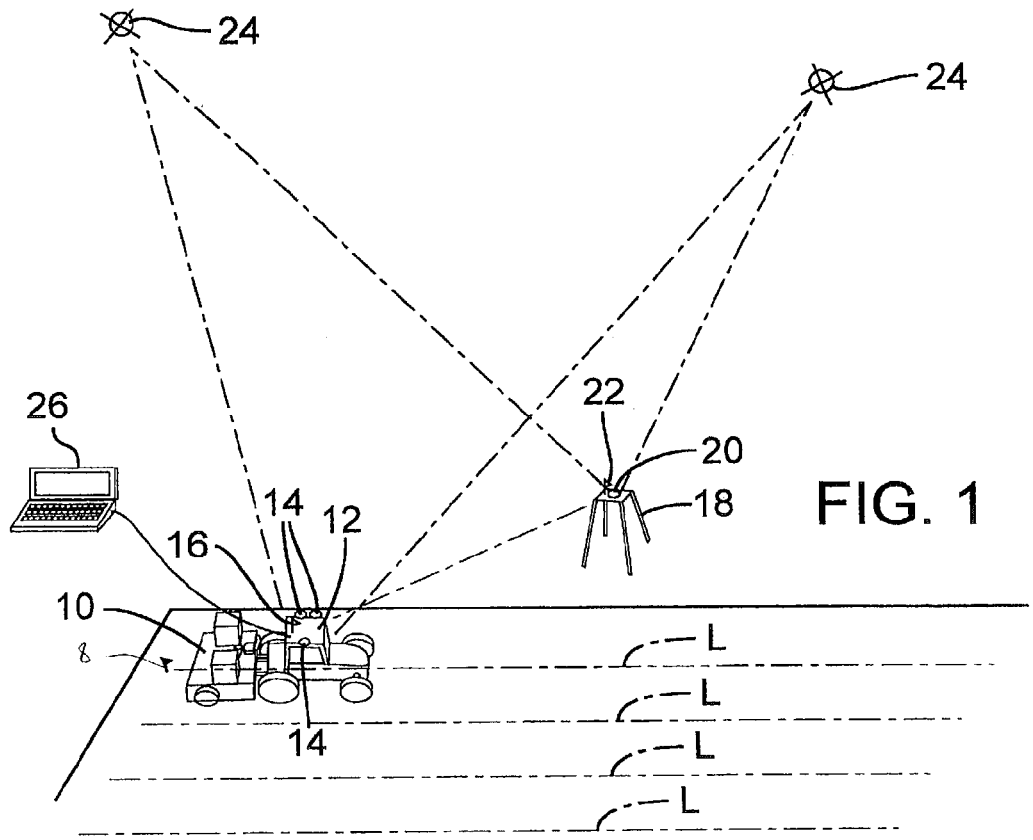
FIG. 1 is a schematic illustration of a tractor drawing a planting apparatus along predetermined planting paths in a field and a global positioning system being used to guide the tractor to automatically follow the planting paths.

FIG. 1 depicts one embodiment of a planting apparatus shown being drawn along the ground by a tractor 12 (or other vehicle). The planting apparatus may be an attachment for towing by the tractor or may be built into a self-contained vehicle. The planting apparatus 10 can be used to plant rows of plants in a field or orchard, as further described below. Without limitation, some examples of plants that can be planted with the planting apparatus 10 include trees and shrubs, such as, blueberry plants, cherry trees, nursery stock and various other agricultural products, such as seeds, bulbs and cuttings.

In one implementation, and as shown in FIG. 1, the tractor 12 is automatically guided along pre-established planting paths L by a guiding system as the planting apparatus 10 forms a row of spaced-apart plants along each planting path L. In the illustrated embodiment, the guiding system comprises a global positioning system (GPS), which is schematically illustrated in FIG. 1. The GPS includes one or more GPS receivers 14 mounted at a convenient position on the tractor 12, such as the top of the roof of the tractor 12, as shown in FIG. 1. GPS receivers 14 receive signals from one or more satellites 24 orbiting the earth. The signals from GPS receivers 14 are inputted into a processing device, such as the illustrated laptop computer 26, onboard the tractor 12. The computer 26 processes the signals in a known manner to determine the instantaneous position or coordinates of the tractor 12. To increase the accuracy of the GPS, a stationary receiving unit 18 also can be used. The stationary receiving unit 18 includes at least one GPS receiver 20 and a radio transmitter 22. GPS receiver 20 receives signals from satellites 24, which are then transmitted from transmitter 22 to a radio receiver 16 on the tractor 12 for processing by the computer 28 in determining the position of the tractor 12.

The steering system of the tractor 12 desirably is retrofitted with an automatic steering system that is in communication with computer 26 of the GPS. Based on positioning data from the computer 26, the steering system automatically controls the steering of the tractor 12 such that the tractor follows the current planting path L. As the tractor 12 is guided along the current planting path L, the planting apparatus 10 automatically plants a row of plants along the planting path, as further described below. The use of such a guiding system is advantageous in that the plants can be aligned in each row with greater precision than by manual planting, thereby resulting in less crop loss at harvest. One example of a GPS and an automatic steering system that can be used with the tractor 12 is an AutoFarm GPS 5001 AutoSteering System, commercially available from IntegriNautics Corporation of Menlo Park, Calif., although other systems also can be used.

In one approach for establishing a field of plants, the ends of the first planting path are marked off with a flag 8 or other marker (one of which is shown in FIG. 1). The location or coordinates at each marker is identified with the GPS and inputted into the computer 26. An operator can input into the computer 26 the desired number of planting paths (equal to the number of rows of plants to be planted) and the desired spacing between planting paths. Based on this information, the computer 26 determines the end locations of each planting path. Beginning at one end of the first planting path, the tractor 12 is used to draw the planting apparatus 10 (or a planting-bed former, such as discussed below, if raised planting beds are formed along the planting paths prior to planting the plants) along the planting path. As the tractor 12 moves along the planting path, the GPS system detects the instantaneous position of the tractor 12 and the steering system controls the positioning of the wheels of the tractor 12 such that the tractor follows the predetermined path. After the tractor 12 has traveled each planting path, the computer 26 generates a map of the field identifying the actual locations of the planting paths. The map can be saved in a historical file and used at a later time. For example, if the map is generated after forming raised planting beds along the planting paths, the map then can be used to guide the tractor 12 when drawing the planting apparatus 10 for planting plants in the planting beds. As another example, the map can be used to guide the tractor 12 when drawing a harvesting machine along the row of plants to harvest the crop of the plants.

While the illustrated guiding system utilizes a GPS, other types of guiding systems also can be used to guide the tractor 12. Examples of other types of guiding systems include, without limitation, a laser-based guiding system or a guiding system that utilizes infrared emitters and sensors to detect the position of a vehicle. In still other less desirable embodiments, the tractor 12 does not include a guiding system, in which case the tractor 12 is manually steered by a driver.

Figure 4:
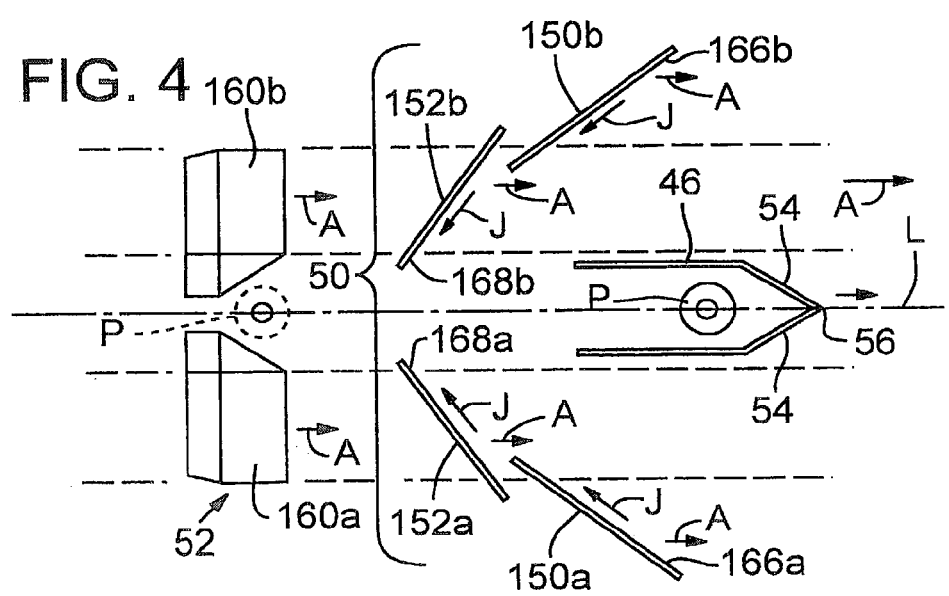
FIG. 4 is a schematic, overhead plan view of a trench former, a trench filler, and a hill shaper of a planting apparatus, according to one embodiment.
Figure 2:
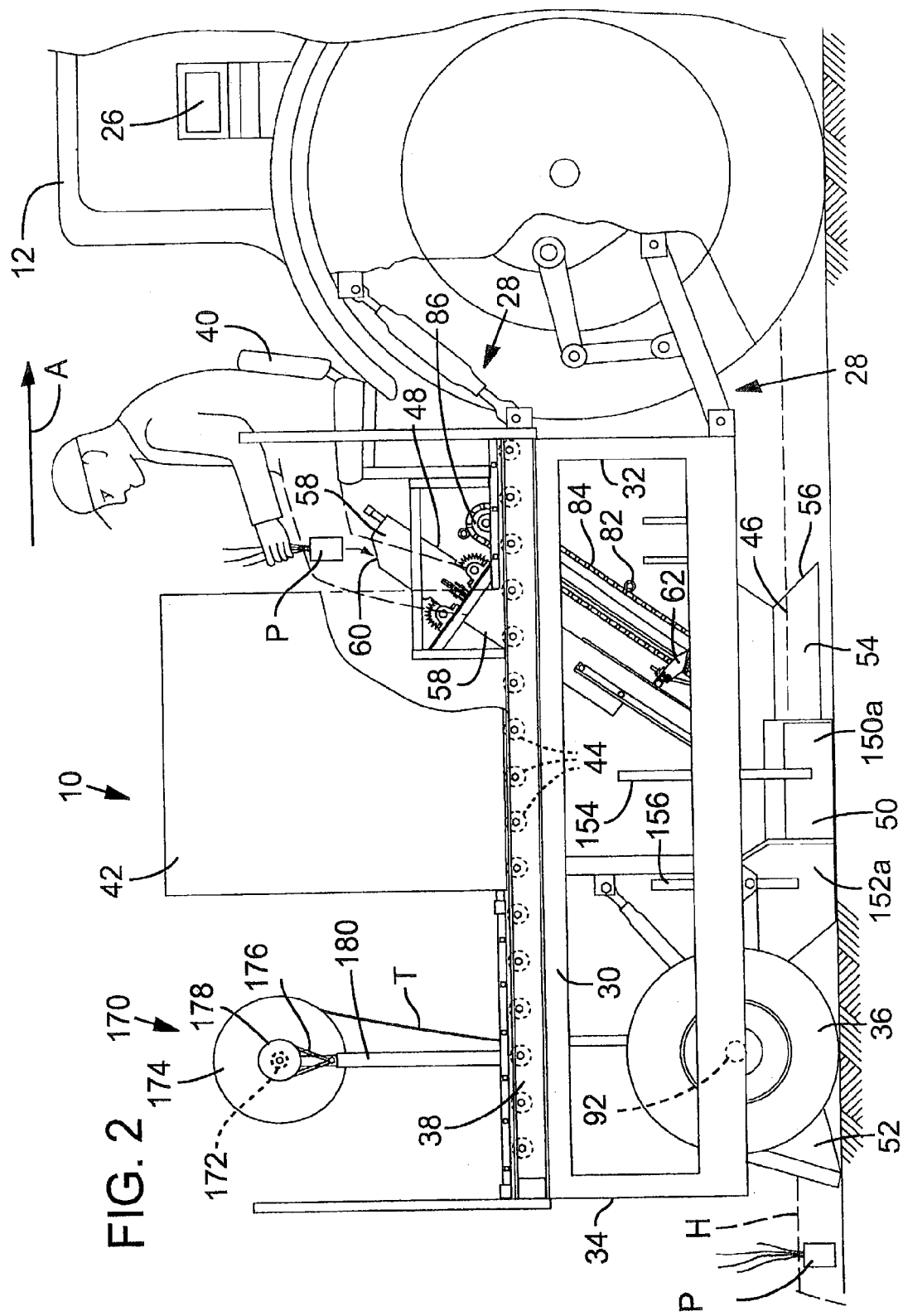
FIG. 2 is a side elevation view of the planting apparatus according to one embodiment.

Referring now to FIG. 2, the illustrated planting apparatus 10 can be coupled to the tractor 12 in a conventional manner, such as with a conventional three-point hitch 28. The planting apparatus 10 comprises a main body 30, which in the illustrated form comprises a frame-like structure. The body 30 includes a forward end 32 coupled to the three-point hitch 28 and an aft end 34 supported for movement along the ground such as by wheels 36 (FIGS. 2 & 4). The three-point hitch 28 desirably is operable to raise or lower the position of the body 30 above the ground. A platform 38 of the body 30 supports a chair 40 for a worker and one or more containers 42 of plants P to be planted by the planting apparatus 10. The platform 38 can include rollers 44 to allow the containers 42 to be easily moved along the upper surface of the platform 38. The planting apparatus 10 in the illustrated configuration also includes a furrow former 46 (also referred to herein in other embodiments as a trench former) for forming a continuous furrow or trench in the ground, a planting unit 48 (also referred to herein in other embodiments as a planting mechanism) for depositing individual plants P in the furrow, a trench filler 50 (also referred to herein in other embodiments as a furrow filler) for replacing earth back into the trench after plants P have been deposited therein by the planting unit 48, and a hill shaper 52 (also referred to herein in other embodiments as a hill former).

In FIG. 2, the planting apparatus 10 is shown being used to plant a row of plants P in a continuous hill or raised planting bed H previously formed along the respective planting path L. Berry plants, such as blueberry plants and cherry trees, are examples of plants that are typically planted in a raised planting bed. Of course, the planting apparatus 10 also can be used to plant plants in generally flat ground without raised beds.

As shown in FIG. 2, the furrow former 46 is coupled to the underside of the body 30 proximate the forward end 32. As best shown in FIG. 4, the illustrated furrow former 46 includes blade portions 54 that are connected at a forward end 56 and diverge away from each other in the rearward direction (i.e., toward the aft end 34 of the body). As the tractor 12 pulls the planting apparatus 10 in the forward direction (in the direction of arrows A), the blade portions 54 cut through the earth, thereby forming a continuous trench along the length of the hill. The depth of the trench can be altered by raising or lowering the body 30, and therefore furrow former 46, using the three-point hitch 28.

Figure 3:
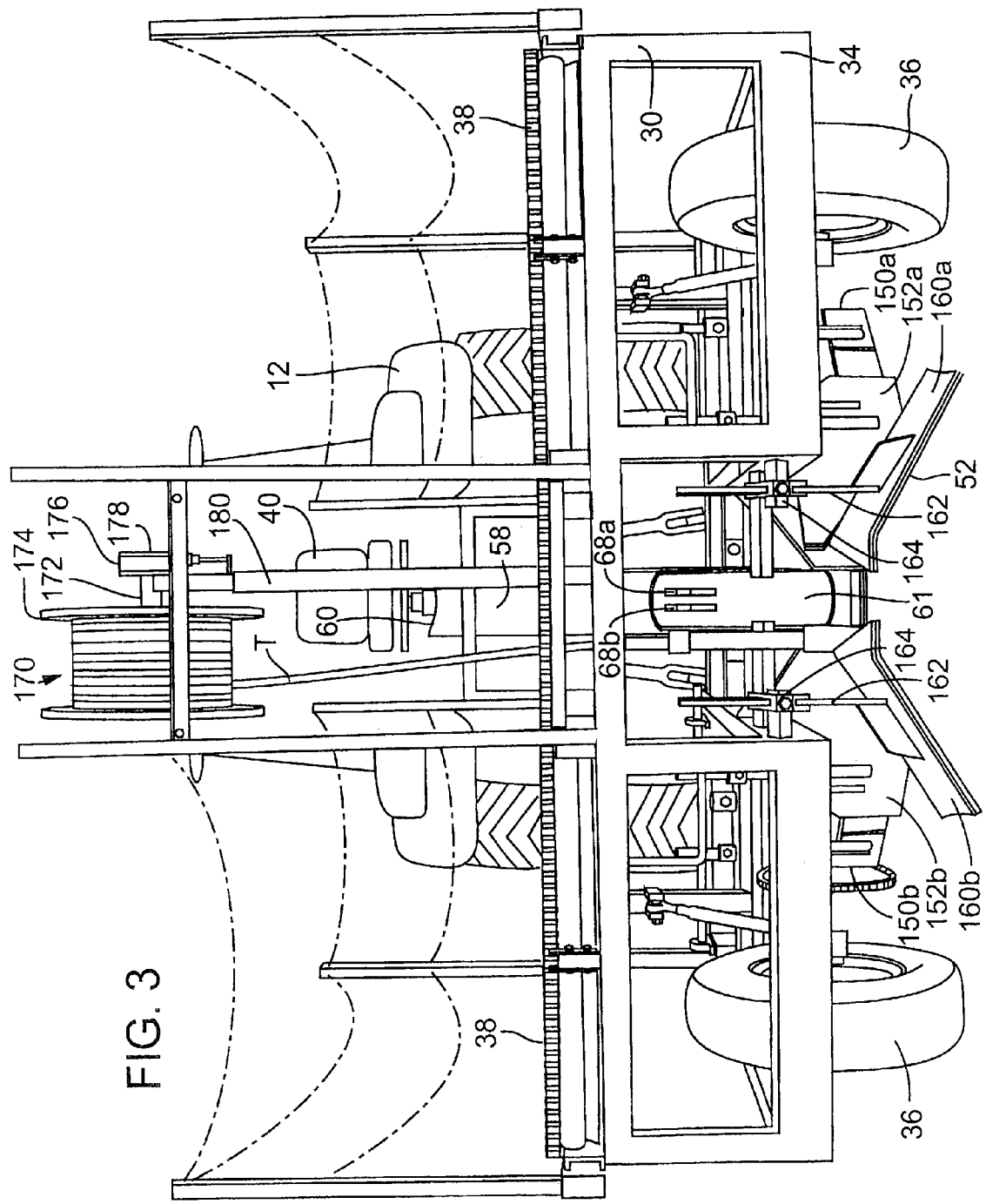
FIG. 3 is a rear elevation view of the planting apparatus of FIG. 2.

As illustrated in FIG. 2, a worker individually feeds plants P into the planting unit 48, which automatically deposits the plants P in the trench at predetermined intervals as the planting apparatus 10 moves along the respective planting path L. An automatic plant feeder may alternatively be used to insert or load plants into the planting unit 48 so as to obviate the need for a worker to perform this task. Referring to FIGS. 2–5, the planting unit 10 in the illustrated embodiment generally includes a hollow guide 58 for guiding plants P into the trench. The guide 58 has an open top end 60 (FIGS. 2 & 4) that serves as an inlet through which individual plants P are inserted and an open bottom end, or outlet, 61 (FIG. 3). In particular embodiments, the guide 58 can be made, for example, from conventional PVC pipe or other suitable materials.

Figure 5:
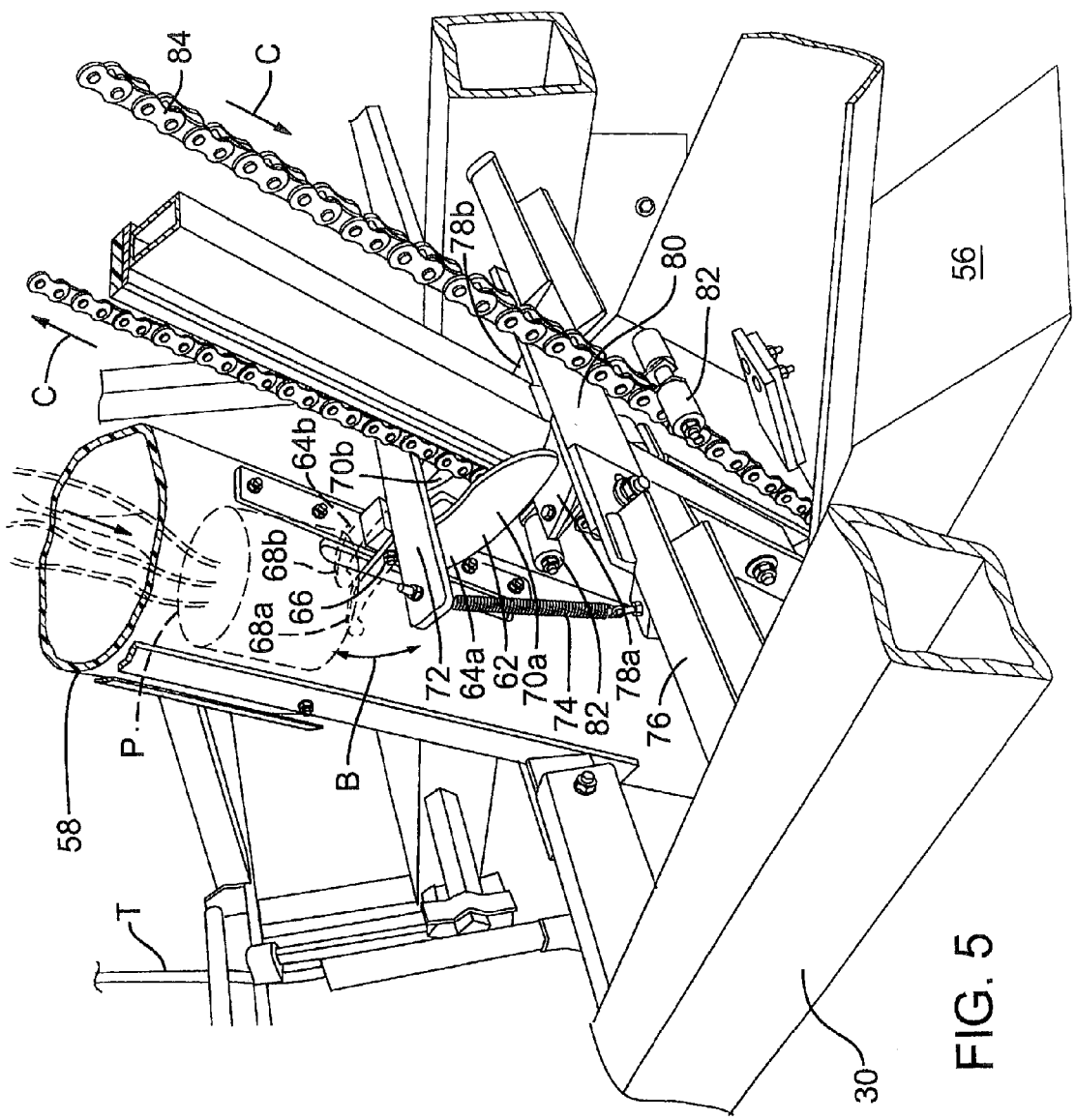
FIG. 5 is an enlarged, perspective view of a portion of the planting apparatus of FIG. 2, illustrating one embodiment of a planting unit.

As best shown in FIG. 5, when a plant P is inserted into the guide 58, the plant P is temporarily supported by a releasable support, such as, in one form, a pivotable lever 62 and prevented from falling completely through the guide 58. An actuator controls the releasable support (e.g., lever 62) to release the plant for travel toward outlet 61. For example, the movement of the lever 62 may be controlled by a lever actuator to shift the lever from underneath the plant to allow the plant to fall through the guide 58 and land in the trench at a location which is a predetermined distance from a previously planted plant. After the plant is released by the lever 62 and falls through the guide 58, another plant can be inserted into the guide 58 by the worker.

Figure 6:
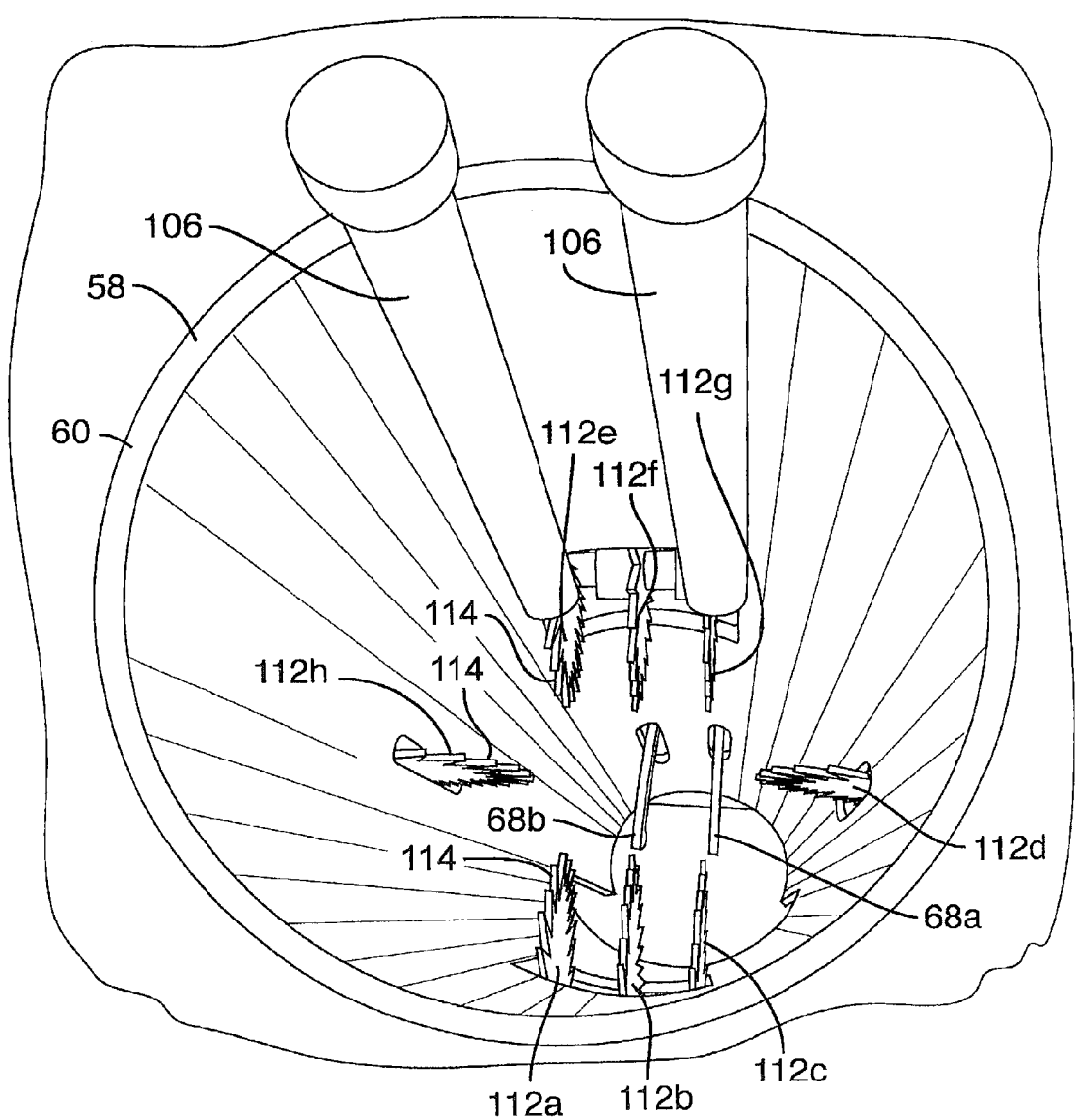
FIG. 6 is an enlarged, perspective view of a portion of the planting apparatus of FIG. 2, illustrating the inside of the guide of the planting unit shown in FIG. 5.

The lever 62 in the illustrated configuration comprises first and second lever arms 64a and 64b (FIG. 5), respectively, that are pivotable together about pivot pin 66, in the directions indicated by double-headed arrow B. Each lever arm 64a, 64b has a respective plant supporting distal or first end portion 68a, 68b extending partially into the guide 58 and a respective second end portion 70a, 70b. The lever arms 64a, 64b pivot together between a first, support position (as shown in FIG. 3) in which the first end portions 68a, 68b extend generally laterally with respect to the longitudinal axis of the guide 58 for supporting a plant P inserted into the guide 58 and a second, release position (not shown), in which the first end portions 68a, 68b are pivoted downwardly to allow the plant P to pass through the guide 58. As shown in FIG. 6, the guide 58 may further include one or more plant motion directors, such as elongated internal guide rails 106 that extend partially through the guide 58, such as in a direction parallel to the longitudinal axis of the guide 58. A plant P placed between the guide rails 106 at the upper end 60 of the guide 58 slides between and/or along the guide rails 106 as it moves downwardly through the guide 58.

The lever arms 64a, 64b may be positively shifted between the first and second positions. Alternatively, the levers arms 64a, 64b may be normally biased toward the support position by a biasing mechanism and are periodically caused to pivot to the release position by a tripping mechanism to release a plant supported on first end portions 68a, 68b. The biasing mechanism in the illustrated embodiment comprises a pressure bar 72 extending across the second end portions 70a, 70b of lever arms 64a, 64b, and compression springs 74 (only one of which is shown in FIG. 5). Each compression spring 74 is connected to a respective end of the pressure bar 72 and an adjacent support member 76 of the body 30. In this manner, the compression springs 74 exert a downwardly directed biasing force on pressure bar 72, which in turn urges the lever arms 64a, 64b to the support position shown in FIG. 5. A stop, such as motion limiting members 78a and 78b extending from a support member 80 of the body 30, are positioned to contact second end portions 70a, 70b of levers arms 64a, 64b, and thereby prevent the lever arms from pivoting beyond the support position shown in FIG. 5 under the biasing force exerted by the pressure bar 72.

In the illustrated embodiment, as shown in FIG. 5, a tripping mechanism is provided for selectively or periodically pivoting the lever arms 64a, 64b against the biasing force of the pressure bar 72. In one form, the tripping mechanism comprises one or more tripping bars 82 coupled to a movable drive member, such as the illustrated chain 84. Where more than one tripping bar 82 is provided, such as shown in FIG. 5, the tripping bars 82 desirably are equally spaced along the length of the chain 84 so that plants are equally spaced by the planting unit 48 along the planting path. Chain 84 is reeved around a drive sprocket 86 rotatably supported on a shaft 88 at a position above the lever arms 64a, 64b (FIGS. 2 and 7) and an idler sprocket (not shown) rotatably supported on a respective shaft at a position below the lever arms 64a, 64b. In use, drive sprocket 86 is rotated to cause chain 84 to move in the direction of arrow C (FIG. 5) so that tripping bars 82 selectively "trip" lever arms 64a, 64b and cause the plant P supported by the lever arms to fall through the guide 58. More specifically, as a tripping bar 82 engages second end portions 70a, 70b, the second end portions 70a, 70b pivot upwardly against the biasing force of pressure bar 72 and first end portions 68a, 68b pivot downwardly to allow a plant P supported on first end portions 68a, 68b to fall through the guide 58 by gravity. When the tripping bar 82 clears the second end portions 70a, 70b, the lever arms 64a, 64b move back to the support position under the biasing force of pressure bar 72. After the plant falls through the guide 58, another plant P can be inserted into the guide 58 via an automatic plant feeder or by a worker.

Movement of chain 84 can be accomplished in any suitable manner. In the illustrated embodiment, for example, drive sprocket 86 is mounted on shaft 88 (FIG. 7). A chain 90 is reeved around a sprocket (not shown) mounted on shaft 88 and another sprocket (not shown) that is coupled to an axel 92 (FIG. 2) of the body 30 through a drive assembly (not shown). In this manner, forward movement of the planting apparatus 10 causes movement of chain 90, which in turn rotates shaft 88 to move chain 84 in the direction of arrow C. As shown in FIG. 7, a clutch 130 is interposed between sprocket 86 and the sprocket around which chain 90 is reeved. The clutch 130 prevents rotation of the shaft portion supporting sprocket 86, and therefore movement of chain 84, when the planting apparatus 10 is moved in the rearward direction. In this embodiment, the spacing between plants in a row depends in part on the spacing between tripping bars 82 and the gearing ratio of the drive assembly that transfers rotational movement of axle 92 to rotational movement of drive sprocket 86. Hence, tripping bars 82 can be added to or removed from chain 84 or the gearing ratio of the drive assembly can be changed as needed to achieve a desired spacing between plants in a row. In an alternative embodiment, chain 84 can be driven by a dedicated motor or engine mounted to the body 30. In the latter embodiment, spacing between plants can be easily adjusted by controlling the speed of the motor or engine.

The planting unit 10 can also include a root loosener (also referred to herein in other embodiments as a root-loosening device, root-loosening mechanism or root roughener) for loosening the root balls of plants. As shown in FIGS. 6 and 7, the root loosener in the illustrated embodiment comprises one or more sprocket-like blades 112a, 112b, 112c, 112d, 112e, 112f, 112g, and 112h, each mounted for rotational movement with respect to the guide 58. Each blade 112a–h is formed with a plurality of root ball impacters, such as circumferentially spaced teeth 114. As shown in FIG. 6, blades 112a–h extend into the internal pathway defined by the guide 58 so that the root ball of a plant dropped into the guide 58 is engaged by the teeth 114 of the blades.

As shown in FIG. 7, blades 112a, 112b, 112c are mounted on a shaft 116, one end of which includes a sprocket 118 driven by a chain 120. Blades 112e, 112f, 12g are mounted on a shaft 122, one end of which includes a sprocket 124 also driven by chain 120. Hence, blades 112a, 112b, 112c, 112e, 112f, and 112g are caused to rotate upon movement of chain 120, and therefore serve as driven blades. Although they may be driven, in the form shown, blades 112d and 112h are freely rotatable about their respective axes, and thereby function as idler blades. Movement of chain 120 can be accomplished using various techniques or methods. For example, chain 120 can be coupled to axle 92 (FIG. 2) of the planting apparatus 10 through a drive assembly (not shown) so that movement of the planting apparatus 10 causes movement of chain 120, and therefore movement of blades 112a, 112b, 112c, 112e, 112f, and 112g. Alternatively, chain 120 or each shaft 116, 122 can be driven by a respective motor or engine to rotate blades 112a, 112b, 112c, 112e, 112f, and 112g.

In use, driven blades 112a, 112b, and 112c are desirably rotated in the direction indicated by arrow D and driven blades 112e, 112f, and 112g are desirably rotated in the direction indicated by arrow E. When a plant is dropped into the guide 58, the root ball of the plant is engaged by the teeth 114 of the blades, which propel the plant downwardly toward the first end portions 68a, 68b of lever arms 64a, 64b. As the teeth 114 engage the root ball, the rotation of teeth 114 relative to the root ball has the effect of "roughening" the root ball so that individual roots or clusters of roots are separated or loosened from the root ball. Advantageously, roughening or loosening the root ball in this manner promotes root growth, and results in earlier and greater crop yields.

Although the illustrated embodiment is shown as having six driven blades and two idler blades, this is not a requirement. Accordingly, the number of driven blades and/or idler blades can be modified as desired. For example, all of the blades shown in FIGS. 6 and 7 can be driven blades. Other root ball loosening mechanisms may be used. Alternatively, the root balls of plants may be roughened or loosened prior to insertion into the guide 58, or less desirably, planted without being roughened.

FIG. 8 schematically illustrates an embodiment of an electronically controlled planting unit that can be used in the planting apparatus 10. In this embodiment, a lever 94 extends into a guide 58 of the planting unit. The lever 94 is connected at one end to an actuator 96, which pivots the lever 94 in the directions indicated by double-headed arrow B between a support position and a release position, as previously described. Movement of actuator 96 in this embodiment is electronically controlled by a controller 98 (e.g., a PLC controller) and a rotation sensor 100. The rotation sensor 100 includes a rotatable element 101 mounted to the axle 92 and a reader 102 mounted adjacent the rotatable element 101. The reader 102 detects movement of the rotatable element 101 through a predetermined angle, which movement corresponds to forward movement of the planting apparatus 10 a distance equal to the desired spacing between plants along a planting path L. Each time the reader 102 detects movement of the rotatable element 101 through the predetermined angle, a signal is sent to the controller 98, which in turn controls the actuator 96 to pivot the lever 94 downwardly to release the plant supported on the lever 94, and then to pivot upwardly back to the support position to support the next plant inserted into the guide 58. The controller 98 desirably has a keypad 99 or other input device, as known in the art, to allow a user to set the desired spacing between plants.

Various other techniques or devices can be used to control the release of plants from the planting unit. For example, controller 98 can be a simple programmable timing mechanism that periodically sends a planting signal to the actuator 96 to pivot the lever 94 for releasing a plant. In the latter example, if the speed of the planting apparatus is known, the duration between planting signals can be selected to achieve a desired spacing between plants. In other embodiments, actuator 96 can be pneumatically or hydraulically driven.

In another implementation, positional information from the GPS can be used to control the planting of plants at specific locations along a planting path. In one embodiment, for example, the computer 26 of the GPS (FIG. 1) is in communication with actuator 96 (FIG. 8). As the planting apparatus moves along a planting path, the computer 26 compares the instantaneous positions detected by the GPS with pre-established planting locations. The computer 26 sends a planting signal to the actuator 96 to release a plant when it is detected that the current position of the planting apparatus is such that the plant will land at a pre-established planting location.

In alternative embodiments, a pivoting lever can be replaced with another type of movable support member for temporarily supporting a plant in the guide 58. FIG. 9, for example, schematically illustrates a planting unit that includes a guide 58 and a support member 104. Support member 104 moves laterally into and out of the guide 58, in the directions indicated by double-headed arrow F, to support a plant in the guide 58 and to allow the plant to fall through the guide 58, respectively. Movement of support member 104 can be, for example, mechanically, electrically, pneumatically or hydraulically controlled. In another embodiment, support member 104 can be pivoted into and out of the guide 58 in a plane extending generally radially through the guide 58. In general, any mechanism which is selectively controllable to constrict or impede travel of the plant to the planting location may be used.

Referring to FIG. 4, the trench filler 50 in the illustrated form comprises a forward set of blades 150a and 150b and an aft set of blades 152a and 152b, partially overlapping the forward blades 150a, 150b. In other embodiments, however, the trench filler 50 can include only one set of blades or more than two sets of blades. In any event, the inside surfaces 166a and 166b of blades 150a and 150b, respectively, and the inside surfaces 168a and 168b of blades 152a and 152b, respectively, can be made of, or have mounted to, a low friction material, such as U.H.M.W. polyethylene, to resist build-up of earth on the blades. Blades 150a and 150b converge toward each other from their forward ends toward their aft ends such that the spacing between the blades is greatest at their forward ends and smallest at their aft ends. Blades 152a and 152b also converge toward each other from their forward ends toward their aft ends. Desirably, although not necessarily, the angle defined between blades 152a and 152b is greater than the angle defined between blades 150a and 150b. As shown in FIG. 2, blades 150a, 150b and blades 152a, 152b can be mounted to the lower end portions of respective posts 154 and 156, respectively. Posts 154 and 156 can be mounted to the body 30 with releasable clamps or other releasable fasteners (not shown) and can be configured to enable lowering or raising of the blades and/or adjustment of the angles between opposing blades.

In other embodiments, the trench filler can comprise one or more rotatable discs mounted on a shaft and operable to move earth into the trench, as known in the art.

As illustrated in FIG. 4, as the planting apparatus 10 moves in the forward direction (in the direction of arrows A), earth between the forward ends of blades 150a, 150b is moved inwardly, in the directions indicated by arrows J, by blades 150a, 150b, and then by blades 152a, 152b, causing the earth to fill the previously formed trench and cover the root balls of the plants P deposited in the trench by planting unit 48.

As best shown in FIG. 4, one form of the illustrated hill former 52, if used, comprises opposing blades 160a, 160b. As shown in FIG. 3, each blade 160a, 160b can be mounted to the lower ends of a respective post 162, which in turn is mounted to the body 30. Posts 162 can be mounted to the aft end 34 of the body 30, such as with releasable clamps 164 to allow raising or lowering of the blades 160a, 160b. As the planting apparatus 10 moves in the forward direction, the blades 160a, 160b shape or smooth out the pile of earth along the planting path L to form a hill in the shape of the original planting bed. Of course, in applications where the planting apparatus 10 is used to plant plants in generally flat ground, the hill former 52 would not be used.

As shown in FIGS. 2 & 3, the planting apparatus 10 can include an optional dispensing apparatus 170 mounted to the body 30 for dispensing a drip tube or hose T along the planting paths L. The illustrated dispensing apparatus 170 includes a spindle 172 mounted for rotational movement on post 180. A roll or spool 174 of the drip tube T is rotatably supported on the spindle. The dispensing apparatus 170 can include a tension band 176 reeved around a pulley 178 mounted on the spindle 172. Band 176 applies a constant force to pulley 178 to prevent over-acceleration of the spindle 172 when the drip tube is being dispensed and to retard rotation of spindle 172 when the drip tube is not being dispensed from the spool 174. The drip tube T may be laid on top of the ground along a planting path, or alternatively, slightly buried underground along the planting path.

Although the illustrated planting apparatus 10 is shown as having a furrow former 46, a planting unit 48, a trench filler 50, and a hill former 52, all mounted to the body 30, this is not a requirement. For example, in an alternative embodiment, the planting apparatus includes a planting unit 48 and one or more of the other components (i.e., the furrow former 46, trench filler 50, and hill former 52) can be mounted to separate vehicles. Thus, in the latter embodiment, a vehicle, such as a tractor, is used to move the furrow former 46, which is followed by another vehicle moving the planting unit 48, and so on. Alternatively, a single vehicle can be used for each implement (e.g., the furrow former 46, planting unit 48, trench filler 50, and hill former 52) in making successive passes along a planting path, (i.e., forming a furrow in a first pass, placing a row of plants in the furrow in the second pass, filling the trench in a third pass, and shaping the hill in a third pass). Of course, this approach is less efficient than performing these steps in a single pass.

In another embodiment, the furrow former 46 can be replaced with a hole former for forming discrete holes along a planting path. The hole former can be, for example, an auger or similar device mounted to the body 30 forward of the planting unit for forming holes at the planting locations.

Figure 10:
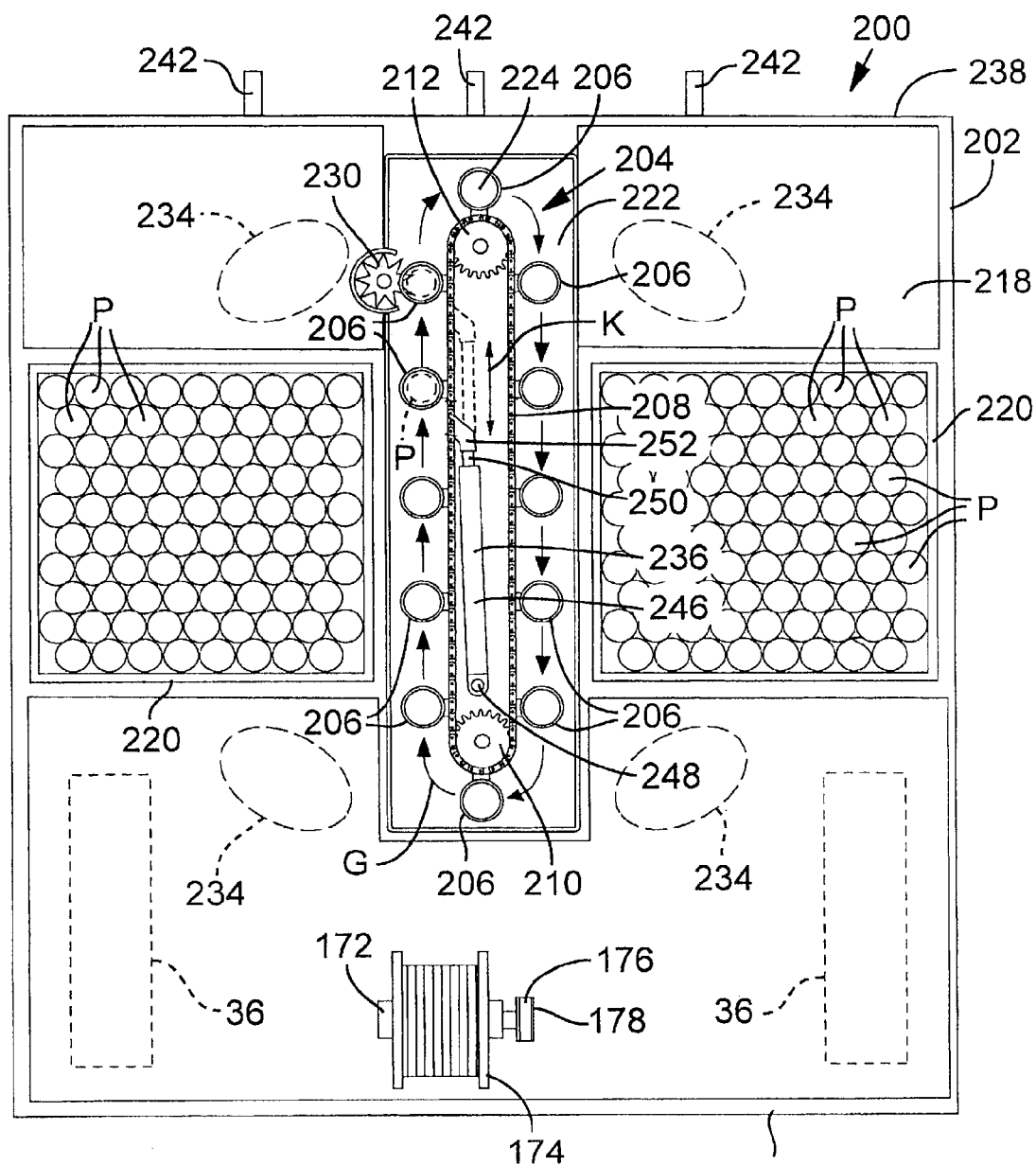
FIG. 10 is a schematic, overhead plan view of a planting apparatus, according to another embodiment.

Referring to FIGS. 10 and 11, there is shown another embodiment of the planting apparatus, indicated generally at 200. By way of example, FIG. 11 shows the planting apparatus 200 being used to plant plants in generally flat ground, although it also can be used to plant plants in a raised planting bed. As shown in FIG. 10, planting apparatus 200 includes a body 202 having a forward end 238 and an aft end 240. The forward end 238 includes connectors 242 for coupling the body to a tractor or other vehicle, such as with a three-point hitch. The aft end 240 is supported for movement across the ground, such as by wheels 36. The body 202 in the illustrated configuration also includes a platform 218 for supporting one or more containers 220 of plants P to be planted.

A planting unit 204, in the form shown, comprises multiple plant holders 206 coupled to a drive mechanism, such as a movable chain 208 or other force transmitting member reeved around sprockets 210 and 212. A dual-acting piston/cylinder assembly 236 (which can be, for example, pneumatically or hydraulically driven) is mounted between sprockets 210, 212, and controls the movement of chain 208. The piston/cylinder assembly 236 includes a cylinder housing 246 mounted to the platform 218 at 248 and a piston 250. Piston 250 is retractable and extendable into and out of the cylinder 246 in the directions indicated by double-headed arrow K. Mounted to the end of the piston 250 is a ratcheting type connector 252 coupled to the chain 208. Connector 252 is configured to lock onto and move the chain 208 when the piston 250 extends outwardly from the cylinder 246. However, when the piston 250 retracts into the cylinder 246, connector 252 slides relative to chain 208 so as not to move the chain 208 in the opposite direction. Thus, chain 208 and holders 206 are incrementally advanced in the direction of arrow G each time the piston 250 is extended. In another embodiment, chain 208 can be moved by driving one or both sprockets 210, 212.

Each plant holder 206 has an open top end 214 and an open lower end 216 (FIG. 11). Plants stored in containers 220 are loaded by one or more workers into empty holders 206. In one implementation, the platform 218 includes work areas 234 for workers loading plants into empty holders. As best shown in FIG. 11, as chain 208 moves holders 206, plants P loaded into the holders 206 are moved along an upper surface 222 of the platform 218. The upper surface 222 desirably is made from a low-frictional material, such as U.H.M.W. polyethylene, to minimize sliding friction between the plants and the surface 222. The platform 218 is formed with an aperture 224 (as best shown in FIG. 11) in the pathway of the holders 206. A guide 226 (FIG. 11) extends downwardly from the aperture 224. The aperture 224 is desirably dimensioned large enough so that plants passing over the aperture 224 fall into the guide 226 and are directed into a trench formed by trench former 46.

A positioner, such as positioning mechanism 228 is mounted to the bottom of the body 202 adjacent the lower end of the guide 226. When a plant falls into the trench, the positioning mechanism 228 engages the plant and pushes the plant in the forward direction in the trench. When the plant is at the desired planting location, the positioning mechanism 228 is moved away from the plant, allowing the plant to remain at the planting location in the trench. Positioning mechanism 228 can be, for example, a lever or bar that is pivoted or swung away from the plant. Various mechanical, electrical, or electromechanical mechanisms can be used to control movement of the plant-positioning mechanism 228. For example, movement of plant-positioning mechanism 228 can be controlled through an actuator 254 or through a drive assembly of chains and sprockets.

In another embodiment, the planting unit 204 does not include a plant-positioning mechanism 228. In this embodiment, the positioning of plants in the trench depends entirely on movement of the holders 206. In another embodiment, a pivoting lever or other movable plant support extends into the guide 226 and is operated to temporarily support a plant that falls into the guide and then release the plant, as described above.

The illustrated planting apparatus 200 may also include one or more rotatable blades 230 for roughening or loosening the root balls of plants P being moved by holders 206. Blades 222, mounted for rotational movement to the upper surface 222, may have a construction similar to blades 112*a*–*h* shown in FIGS. 6 and 7. As shown in FIG. 10, the blades 230 extend partially into the path of the holders 206. The holders 206 are desirably formed with slots 232 (FIG. 11) to allow the teeth of the blades 230 to extend into the holders 206 and engage the root balls of the plants contained therein as the holders 206 move the plants past the blades 230. In another embodiment, blades 230 can be mounted to engage the root balls of plants falling through guide 226, such as shown in the embodiment of FIG. 7.

Figure 13:
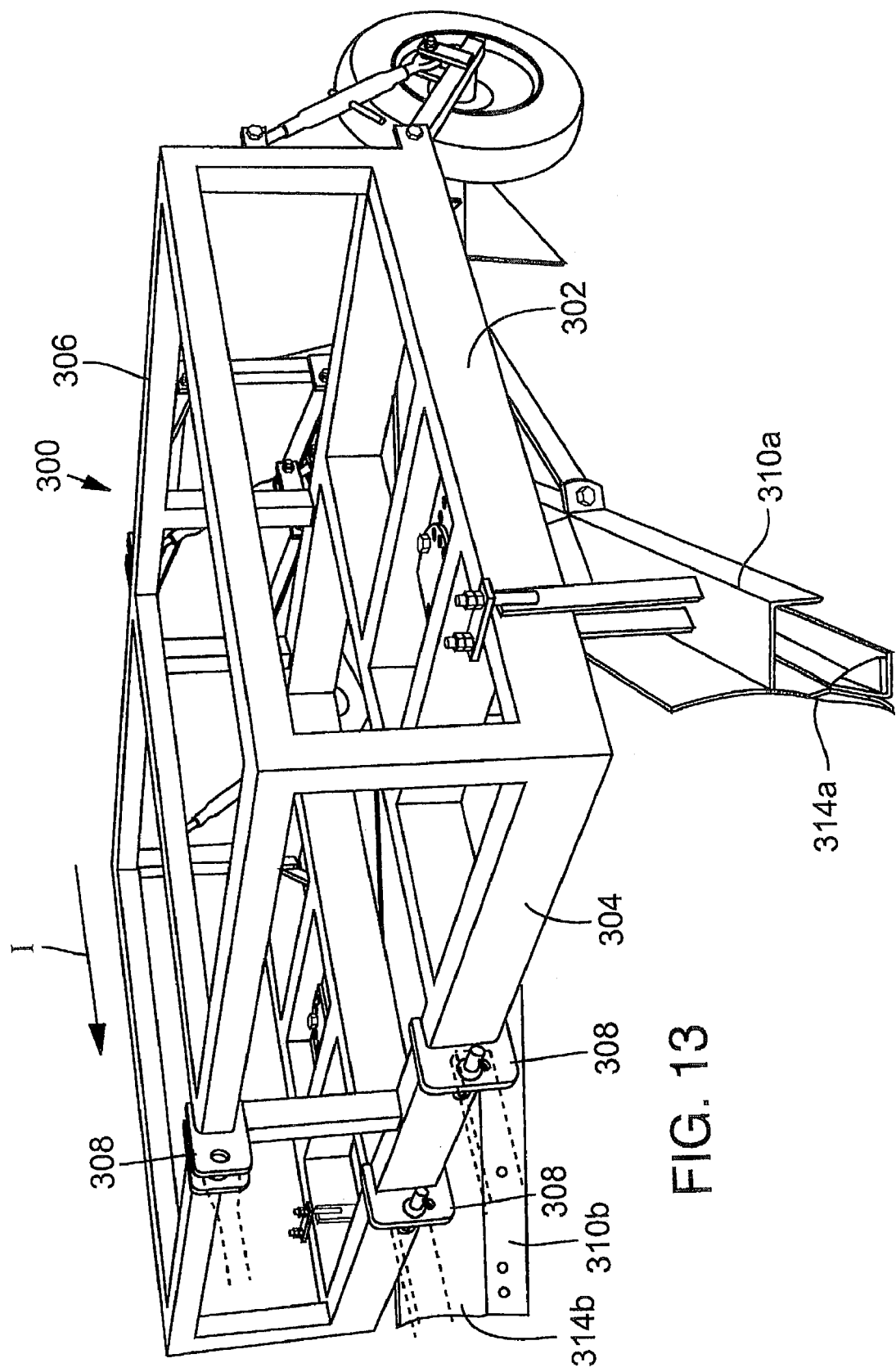
FIG. 13 is a perspective view of the planting-bed former of FIG. 12, as viewed from the side and the front.

FIGS. 12 and 13 illustrate a planting-bed former 300 according to one embodiment for use in forming a continuous hill or raised planting bed along a planting path. The illustrated planting-bed former 300 includes body 302, which can be a frame, having a forward end 304 and an aft end 306. The body 302 can be formed with connectors 308 at its forward end 304 (FIG. 13) to allow the body 302 to be coupled to a tractor, such as with a conventional three-point hitch. The aft end 306 can be supported for movement along the ground, such as by wheels 316. Coupled to the underside of the body 302 proximate its forward end 304 are hill-forming blades 310*a* and 310*b*. Blades 310*a*, 310*b* are laterally spaced but converge toward each other in the rearward direction (i.e., toward the aft end 306 of the body 302). In addition, as best shown in FIG. 12, a hill-shaping mechanism 312 may be coupled to the aft end 306 of the body 302 via extension members 314. In other embodiments, the planting-bed former can comprise one or more rotatable discs mounted on a shaft on the body 302 and operable to move earth so as to form a planting bed, as known in the art.

As the planting-bed former 300 is moved by a tractor or other vehicle across the ground in the forward direction (in the direction indicated by arrow I), earth between the forward ends 314a, 314b of blades 310a, 310b is moved inwardly by blades 310a, 310b to form a continuous pile of earth exiting from the aft ends of the blades. The hill-shaping mechanism 312 passes over the pile of earth formed by blades 310a, 310b, thereby shaping the earth into a planting bed. After the planting bed is formed or several planting beds are formed in a field, a planting apparatus, such as any of the planting apparatus embodiments disclosed herein, can be used to plant rows of plants in the planting beds. This approach for establishing a field of plants is referred to as a two-pass planting process, since the planting beds are formed in a first "pass" and the rows of plants are formed in a second "pass." Of course, if plants are to be planted in generally flat ground, the planting-bed former 300 would not be used.

In one specific implementation, the tractor 12 (FIGS. 1 & 2) equipped with the GPS guiding system is used with the planting-bed former 300 to form a plurality of equally spaced planting beds in a field. After the planting beds are formed, the tractor 12 is used with the planting apparatus 10 (or another planting apparatus such as disclosed herein) to plant rows of plants in the planting beds. In another implementation, a tractor without a guiding system can be used to draw the planting-bed former.

In another implementation, the planting beds are formed and the plants are planted in a one-pass planting process. In this approach, for example, the forward end 304 of the planting-bed former 300 is coupled to the tractor 12 and the forward end 32 of the planting apparatus 10 (or another planting apparatus disclosed herein) is coupled to the aft end 306 of the planting-bed former 300. As the tractor 12 draws the planting-bed former 300 and the planting apparatus 10 across the ground, the planting-bed former 300 forms a planting bed and the planting apparatus 10 forms a row of planted plants in the planting bed.

In another embodiment, an apparatus can include both the planting-bed former 300 and the planting apparatus 10. In this embodiment, for example, the body 30 of planting apparatus 10 is extended and the hill-forming blades 310a, 310b and the hill-shaping mechanism 312 are mounted to the body 30 in front of the furrow former 46.

In another embodiment, an apparatus includes the tractor 12 equipped with a guiding system, such as the illustrated GPS guiding system, and a planting apparatus comprising a conventional transplanter or a conventional seed or bulb planter. In addition, positional information from the GPS can be used to control the planting of the seeds or bulbs at pre-established planting locations.

The present invention has been shown in the described embodiments for illustrative purposes only. The present invention may be subject to many modifications and changes without departing from the spirit or essential characteristics thereof. We therefore claim as our invention all such modifications as come within the spirit and scope of the following claims.

I claim:

1. A system for planting rooted plants in the ground, comprising:
   a vehicle that is movable across the ground, the vehicle having a guiding system for automatically guiding the vehicle to follow a predetermined planting path as the vehicle moves across the ground; and
   a planting apparatus movable with the vehicle such that movement of the vehicle causes the planting apparatus to move across the ground along the planting path, the planting apparatus being operable to plant rooted plants at spaced apart locations along the planting path;
   wherein the planting apparatus comprises a root-loosening mechanism for loosening the root balls of the plants before the plants are planted, the root-loosening mechanism comprising one or more blades.

2. The system of claim 1, wherein the guiding system comprises:
   a global positioning system; and
   an automatic steering system in communication with the global positioning system and operable to steer the vehicle based on positioning information from global positioning system such that the vehicle follows the planting path.

3. The system of claim 1, wherein the planting apparatus is configured to plant a row of plants along the planting path such that there is equal spacing between adjacent plants in the row.

4. The system of claim 1, wherein the planting apparatus comprises a furrow former configured to form a furrow in the earth along the planting path for planting the plants as the vehicle moves the planting apparatus across the ground.

5. The system of claim 4, wherein the planting apparatus comprises a planting unit configured to deposit plants in the furrow as the vehicle moves the planting apparatus across the ground.

6. The system of claim 5, wherein the planting apparatus comprises a furrow filler configured such that, as the vehicle moves the planting apparatus along the planting path, the furrow filler replaces earth in the furrow after plants are deposited in the furrow by the planting unit.

7. The system of claim 6, wherein the planting apparatus comprises a hill shaper configured such that, as the vehicle moves the planting apparatus along the planting path, the hill shaper shapes the earth along the planting path into a hill.

8. The system of claim 1, wherein the planting apparatus comprises a planting unit for depositing plants in a trench formed along the planting path, the planting unit comprising:
   a generally downwardly extending plant guide for guiding plants into the trench by gravity; and
   a plant support being movable with respect to the guide between a first position and a second position, wherein when the plant support is in the first position and a plant is placed in the guide, the plant support supports the plant placed in the guide and wherein when the plant support is moved to the second position, the plant is allowed to fall through the guide into the trench.

9. The system of claim 1, further comprising a planting-bed former being adapted to couple to the vehicle such that movement of the vehicle along the planting path causes the planting-bed former to move along the planting path, the planting-bed former being configured to form a raised planting bed along the planting path as the planting-bed former is moved along the planting path by the vehicle.

10. The system of claim 9, wherein the planting-bed former has a forward end and an aft end, the forward end being coupled to the vehicle, and the planting apparatus has a forward end coupled to the planting-bed former such that the planting-bed former forms a planting bed and the planting apparatus plants plants in the planting bed as the vehicle moves the planting-bed former and the planting apparatus along the planting path.

11. A system for planting rooted plants in the ground, comprising:
   a vehicle that is movable across the ground, the vehicle having a guiding system for automatically guiding the vehicle to follow a predetermined planting path as the vehicle moves across the ground; and a planting apparatus movable with the vehicle such that movement of the vehicle causes the planting apparatus to move across the ground along the planting path, the planting apparatus being operable to plant rooted plants at spaced apart locations along the planting path;

wherein the planting apparatus comprises a planting unit for depositing plants in a trench formed along the planting path, the planting unit comprising:

a generally downwardly extending plant guide for guiding plants into the trench by gravity; and a plant support being movable with respect to the guide between a first position and a second position, wherein when the plant support is in the first position and a plant is placed in the guide, the plant support supports the plant placed in the guide and wherein when the plant support is moved to the second position, the plant is allowed to fall through the guide into the trench;

wherein the plant support comprises at least one lever arm mounted for pivoting movement with respect to the guide between the first position and the second position, and the system further comprises a biasing mechanism that resiliently urges the lever arm to the first position, and one or more tripping bars coupled to a drive member, wherein movement of the drive member causes the one or more tripping bars to selectively pivot the lever arm to the second position against the biasing mechanism.

12. A system for planting rooted plants in the ground, comprising:

a vehicle that is movable across the ground, the vehicle having a guiding system for automatically guiding the vehicle to follow a predetermined planting path as the vehicle moves across the ground; and a planting apparatus movable with the vehicle such that movement of the vehicle causes the planting apparatus to move across the ground along the planting path, the planting apparatus being operable to plant rooted plants at spaced apart locations along the planting path;

wherein the guiding system comprises:

a global positioning system; and an automatic steering system in communication with the global positioning system and operable to steer the vehicle based on positioning information from global positioning system such that the vehicle follows the planting path;

wherein the planting apparatus is in communication with the global positioning system and is operable to plant plants at pre-established planting locations along the planting path based on positioning information from the global positioning system.

13. An apparatus for planting plants in the ground, comprising:

a body movable in a direction of travel across the ground along a planting path; and a planting mechanism mounted to the body, the planting mechanism being operable to automatically plant plants which have been loaded into the planting mechanism in the ground to form a row of plants along the planting path at spaced apart locations, the planting mechanism comprising a root roughener configured to roughen the root balls of the plants without gripping the root balls before the plants are planted in the ground;

wherein the planting mechanism comprises a plant support movable between a first position and a second position, the plant support supporting a plant above the ground when the plant support is in the first position and allowing delivery of said plant to the ground along the planting path when moved to the second position, and wherein the root roughener is configured to engage and propel plants downwardly onto the plant support.

14. The apparatus of claim 13, in which the body comprises a vehicle having a global positioning system for continuously detecting the position of the vehicle and a steering system operatively connected to the global positioning system, the steering system being operable to automatically steer the vehicle along the planting path based on positioning information from the global positioning system as the vehicle moves across the ground.

15. The apparatus of claim 13, further comprising a controller operable to control movement of the plant support between the first and second positions.

16. The apparatus of claim 13, wherein the apparatus further comprises a trench former mounted to the body, the trench former being configured to form a trench in the ground as the body moves across the ground so that the plants are planted in the trench.

17. An apparatus for planting plants in the ground, comprising:

a body movable in a direction of travel across the ground along a planting path;

a planting mechanism mounted to the body, the planting mechanism being operable to automatically plant plants which have been loaded into the planting mechanism in the ground to form a row of plants along the planting path at spaced apart locations, the planting mechanism comprising a root roughener configured to roughen the root balls of the plants before the plants are planted in the ground; and wherein the planting mechanism comprises:

a plant support movable between a first position and a second position, the plant support supporting a plant above the ground when the plant support is in the first position and allowing delivery of said plant to the ground along the planting path when moved to the second position; and an elongated guide having an inlet and an outlet;

the plant support being mounted for movement with respect to the guide, wherein when the plant support is in the first position, the plant support supports a plant inserted through the inlet of the guide and wherein when the plant support is moved to the second position, the plant in the guide falls at least partially under the influence of gravity through the outlet of the guide onto the ground.

18. The apparatus of claim 17, wherein the plant support comprises at least one lever arm mounted for pivoting movement with respect to the guide between the first and second positions, and the planting mechanism further comprises a biasing mechanism that exerts a biasing force for resiliently biasing the lever arm toward the first position and a tripping device configured to selectively move the lever arm to move the second position against the biasing force to release a plant supported by the lever arm.

19. The apparatus of claim 18, wherein the tripping device is operable in response to the distance traveled by the planting apparatus to cause the lever arm to move to the second position to release plants supported by the lever arm such that a predetermined spacing is maintained between plants planted along the planting path.

20. The apparatus of claim 17, wherein the root roughener comprises a rotatable blade extending at least partially into the guide, the blade being rotatable relative to the guide and having a plurality of circumferentially-spaced teeth for engaging and roughening the root balls of plants inserted into the guide.

21. The apparatus of claim 17, further comprising:
a vehicle for moving the body across the ground; and
a guiding system comprising a global positioning system and an automatic steering system in communication with the global positioning system and operable to automatically steer the vehicle based on positioning information from global positioning system such that the vehicle follows a predetermined planting path.

22. An apparatus for planting plants in the ground, comprising:
planting means for automatically planting plants which have been loaded into the planting means into a row of plants along a predetermined planting path;
moving means for moving the planting means along the planting path; and
guiding means for automatically guiding the moving means to follow the planting path so that the plants are substantially aligned in a row to facilitate harvesting of crop from the plants using mechanized harvesting equipment; and
means for loosening the root balls of plants and wherein the planting means comprises a guide configured such that plants loaded into the guide fall through the guide at least partially under the influence of gravity toward the ground.

23. The apparatus of claim 22, wherein:
the moving means comprises a tractor for drawing the planting means along the planting path; and
wherein the guiding means comprises a global positioning system and an automatic steering system in communication with the global positioning system and operable to steer the tractor based on positioning information from global positioning system such that the tractor follows the planting path.

24. The apparatus of claim 22, wherein the means for loosening the root balls of plants loosens the root balls as the plants fall through the guide.

25. The apparatus of claim 22, wherein
the guide comprises an elongated, hollow guide having an inlet and an outlet and an internal passageway for receiving plants extending between the inlet and the outlet; and
the planting means further comprises a plant support that is mounted for movement with respect to the guide, the plant support being movable between a first position and a second position, wherein when the plant support is in the first position, the plant support supports a plant inserted through the inlet of the guide and wherein when the plant support is moved to the second position, the plant in the guide falls through the outlet of the guide and is deposited along the planting path.

26. An apparatus for planting a row of plants in the ground, the plants having roots and limbs extending above the roots, the apparatus comprising:
a body that is movable in a direction of travel across the ground;
a trench former mounted to the body and configured to form a continuous trench in the ground as the body moves across the ground;
a planting unit mounted to the body, the planting unit being operable to position plants at spaced apart locations with at least the roots being positioned in the trench to form the row of plants as the body moves across the ground;
a controller operable to control the planting unit such that a predetermined spacing is maintained between the plants in the trench;
a vehicle adapted to be coupled to the body for moving the body across the ground and a guiding system for automatically guiding the vehicle to follow a predetermined planting path; and
a global positioning system for determining the instantaneous position of the body, the global positioning system being operatively connected to the controller, the controller controlling the planting unit to position plants at pre-established planting locations in the trench based on the instantaneous positions of the body.

27. The apparatus of claim 26, wherein the planting unit comprises a hollow guide, wherein plants inserted into the guide fall downwardly through the guide into the trench at least partially under the influence of gravity.

28. The apparatus of claim 26, wherein the planting unit comprises:
a plant support that is movable between a first position for supporting a plant and a second position for allowing the plant to fall at least partially under the influence of gravity into the trench; and
an actuator coupled to the plant support for moving the plant support between the first and second positions, the actuator being electrically connected to the controller, the controller controlling the actuator to move the plant support between the first and second positions at selected times.

29. An apparatus for planting a row of plants in the ground, the plants having roots and limbs extending above the roots, the apparatus comprising:
a body that is movable in a direction of travel across the ground;
a trench former mounted to the body and configured to form a continuous trench in the ground as the body moves across the ground;
a planting unit mounted to the body, the planting unit being operable to position plants at spaced apart locations with at least the roots being positioned in the trench to form the row of plants as the body moves across the ground;
a controller operable to control the planting unit such that a predetermined spacing is maintained between the plants in the trench; and
a vehicle adapted to be coupled to the body for moving the body across the ground and a guiding system for automatically guiding the vehicle to follow a predetermined planting path:
wherein the planting unit comprises a root-loosening device that is configured to loosen the root balls of the plants before the planting unit positions the plants in the trench, the root-loosening device comprising a blade having a plurality of spaced teeth for impacting the root balls of the plants.

30. A method for planting a row of plants in the ground, the method comprising:
automatically guiding a planting apparatus to follow a predetermined planting path;
automatically planting plants which have been loaded into the planting apparatus along the planting path with the planting apparatus; and
automatically roughening the root balls of the plants prior to planting the plants as the plants fall at least partially under the influence of gravity through a guide.

31. The method of claim 30, wherein the act of automatically planting plants comprises forming a trench along the planting path and automatically depositing roots of each plant in the trench with the planting apparatus such that there is a predetermined spacing between plants.

32. The method of claim 31, wherein the act of automatically planting plants further comprises replacing earth back in the trench after plants are deposited in the trench.

33. The method of claim 30, further comprising forming a continuous, elevated planting bed along the planting path for planting the row of plants prior to automatically planting plants along the planting path with the planting apparatus.

34. The method of claim 33, wherein the planting bed is formed and the plants are planted in the planting bed in a one-pass process.

35. The method of claim 33, wherein the planting bed is formed and the plants are planted in the planting bed in a two-pass process.

36. The method of claim 30, wherein the act of automatically guiding a planting apparatus comprises determining the instantaneous positions of the planting apparatus relative to the planting path, and automatically steering the planting apparatus to follow the planting path based on the instantaneous positions of the planting apparatus.

37. The method of claim 30, wherein the plants comprise blueberry plants.

38. A method for planting a row of plants in the ground, the plants having roots and limbs extending above the roots, the method comprising:
   forming a continuous furrow in the ground;
   depositing the roots of each plant at spaced apart locations in the furrow with a planting mechanism;
   electronically controlling the planting mechanism to deposit the plants in the furrow such that a predetermined spacing is maintained between the plants; and
   moving the planting mechanism with a vehicle and automatically steering the vehicle to follow a substantially straight path when depositing the plants in the furrow;
   impacting the roots of the plants with the teeth of a rotating root-loosening device to loosen the roots before being deposited in the furrow.

39. The method according to claim 38, wherein the plants are propelled downwardly upon contact with the rotating root-loosening device.

40. A system for planting plants in the ground, comprising:
   a vehicle that is movable across the ground, the vehicle having a guiding system for automatically guiding the vehicle to follow a predetermined planting path as the vehicle moves across the ground, the guiding system comprising a global positioning system and an automatic steering system in communication with the global positioning system and operable to steer the vehicle based on positioning information from global positioning system such that the vehicle follows the planting path;
   a planting-bed former being adapted to couple to the vehicle and being movable with the vehicle when coupled thereto, the planting-bed former being configured to form a continuous, elevated planting bed along the planting path as the planting-bed former is moved by the vehicle; and
   a planting apparatus being adapted to couple to the vehicle and being movable with the vehicle when coupled thereto, the planting apparatus being operable to plant plants in the planting bed as the planting apparatus is moved along the planting path by the vehicle, the planting apparatus comprising:
      a furrow former configured to form a furrow in the planting bed for planting the plants;
      a root-loosening device comprising one or more rotating blades that loosen the root balls of the plants;
      a planting unit operable to deposit plants in the furrow such that the plants are equally spaced from each other in the furrow;
      a furrow filler that replaces earth in the furrow after plants are deposited in the furrow by the planting unit; and
      a hill shaper that shapes the earth along the planting path into a hill.

41. A method for producing crops in a field, the method comprising:
   automatically guiding a vehicle having a furrow former to form a plurality of continuous, generally parallel furrows in the field;
   placing crop-producing plants at spaced apart locations in the furrows to form rows of plants;
   replacing earth in the furrows after plants are placed in the furrows;
   generating a map of the field identifying the locations of the rows of plants; and
   harvesting crops from the plants by automatically guiding a vehicle having a harvesting machine along the rows of plants based on the locations of the rows as identified by the map.

42. The method of claim 41, wherein the act of automatically guiding the vehicle comprises determining the instantaneous positions of the vehicle from a global positioning system, and automatically steering the vehicle to follow a plurality of predetermined paths based on the instantaneous positions of the vehicle.

* * * * *

UNITED STATES PATENT AND TRADEMARK OFFICE
CERTIFICATE OF CORRECTION

PATENT NO. : 6,997,120 B2
APPLICATION NO. : 10/439844
DATED : February 14, 2006
INVENTOR(S) : Robert Gabriel It is certified that error appears in the above-identified patent and that said Letters Patent is hereby corrected as shown below:

Column 2, line 12, "to guide." should read --to the guide.--

Column 4, line 20, "a trench" should read --or a trench--

Column 14, line 10, "from global" should read --from the global--

Column 15, lines 44-45, "from global" should read --from the global--

Column 17, line 10, "from global" should read --from the global--

Column 17, line 36, "from global" should read --from the global--

Column 17, line 41, "wherein" should read --wherein:--

Column 18, line 49, "path:" should read --path;--

Column 20, line 1, "from global" should read --from the global--

Signed and Sealed this

Eighth Day of August, 2006

JON W. DUDAS
*Director of the United States Patent and Trademark Office*